Figure 1:
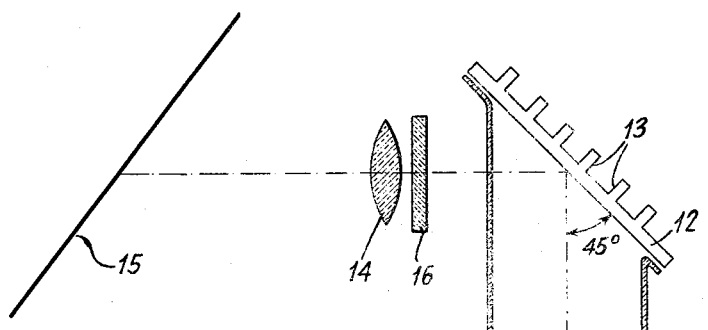

Jan. 30, 1940.　　　　M. KNOLL　　　　2,188,661

ELECTRONIC DEVICE

Filed March 13, 1937

INVENTOR
MAX KNOLL

BY
ATTORNEY

Patented Jan. 30, 1940

2,188,661

UNITED STATES PATENT OFFICE 2,188,661

ELECTRONIC DEVICE

Max Knoll, Berlin, Germany, assignor to Telefunken Gesellschaft für Drahtlose Telegraphie m. b. H., Berlin, Germany, a corporation of Germany Application March 13, 1937, Serial No. 130,618
In Germany March 19, 1936

3 Claims. (Cl. 250—164)

This invention relates to electronic devices and in particular, to cathode ray devices fitted with a screen.

The projection of television pictures, that is to say, the recreation upon a projection surface of an incoming televised image, is attended with certain difficulties when a Braun tube is used as a television receiver. These difficulties are connected with and ascribable to the fact that a comparatively large proportion of the fluorescent light is wasted in the glass bottom of the tube. It has, indeed, been for this reason that in the prior art the suggestion has been made to dispose the fluorescent screen obliquely in reference to the tube axis and to use light radiated towards the vacuum end rather than to utilize for projection the light penetrating from the fluorescent screen across the glass bottom of the Braun tube. This also offers the chance to dispose below the fluorescent screen a light-reflecting coat with the result that also such light rays as are emitted from the granules of the luminous substance in the direction towards the fluorescent screen substratum, at least inside certain limits are utilizable for projection purposes. (See Von Ardenne, Die Kathodenstrahlroehre, page 89, Fig. 103). However, this arrangement known from the prior art involves this serious drawback that the tube wall is so placed in the path of the rays serving for the protection of the fluorescent-screen image that this projection is seriously disturbed.

Another fact in connection with the arrangement known in the prior art is that it is not readily feasible to raise to any considerable extent the volume of electron stream reaching the fluorescent screen, in fact, this is even impossible when the cathode by itself is capable of furnishing higher current intensities. The abduction of heat from the fluorescent screen, as will be readily seen, is insured merely by virtue of conduction along the glass of the bulb and by virtue of heat transfer from glass to ambient air. Outside the art of picture projection upon fluorescent screens it has also been suggested to cool the screen of the Braun tube. In this scheme, however, the fluorescent screen picture was viewed through the chilling fluid with the result that such gains in light as are attainable by raising the current strength of the cathode-rays or their speed are appreciably lost again as a consequence of light absorption in the cooling liquid.

Now, this invention is concerned with a Braun tube adapted to the projection of television pictures in which the cooled fluorescent screen is so mounted, and the shape of the tube bulb so chosen, that the gain of fluorescent brightness or luminosity which is insurable by the use of chilling the fluorescent screen is almost completely utilized, while the quality of projection of the picture upon the fluorescent screen will not be impaired by the glass of the bulb.

For this purpose, a substantially planar cooled fluorescent screen is disposed within a circular cylindrical glass tube in such a way that it will form the terminal or closure wall of the glass tube, and that it forms an angle of approximately 45 degrees in reference to the average direction of the rays.

Figure 2:
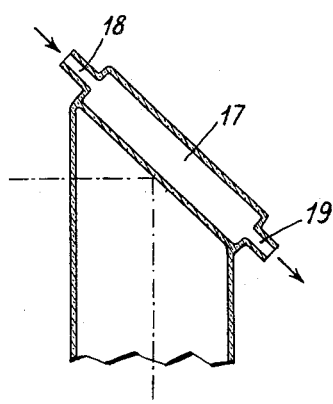

A number of embodiments of the invention are schematically illustrated in the drawing in which Fig. 1 shows schematically a cathode ray tube constructed in accordance with my invention, together with optical projection means, and a viewing screen; and Fig. 2 shows a modification of the end wall of the tube shown in Fig. 1.

Referring to the drawing, Fig. 1, 10 denotes a cylindrical glass tube in which is confined a means indicated by the broken-line square in a schematic way which is adapted to the generation and control (modulation) of cathode rays. The said means comprises a cathode which is suitably heated indirectly, a control device such as a Wehnelt cylinder or shield, an anode as well as, optionally, one or more additional anodes or guns and moreover, under certain circumstances, one or more stops or diaphragms. At the points marked A and B, two pairs of deflector means, preferably deflector coils, are disposed. At the upper end of the glass tube 10 is mounted a metallic support 12 for the fluorescent screen which, if desired, is given a high polish upon the face thereof turned towards the vacuum, and which presents an angle of 45 degrees to the tube axis. The securing may be effected by welding the metal screen onto the glass of the bulb, optionally with the use of intermediary glass, or else by cementing with a high-fusion-point cement, such as a refractory glass enamel. Upon its outer face, the fluorescent-screen support has a plurality of cooling ribs or fins 13. Lens 14 images the fluorescent screen upon the projector surface mounted approximately at point 15.

In an arrangement of the kind shown in Fig. 1 the wall of the bulb in so far as it is contained in the path of the projection beam acts like an optical cylinder lens so that, by the interposition of an additional cylinder lens 16 in the path of the pencil of rays care may be taken so that the fluorescent screen will be projected upon the surface 15 under conditions perfectly free from distortions.

The distortion of the fluorescent screen is avoidable by means of what is known as a trapezoidal deflector. The conditions of deflection moreover are readily adjustable so that upon the projection surface 15 a rectangular or a quadratic re-created picture and thus perfectly undistorted re-creation is insured.

What may also be noted is that the fluorescent-screen support 12 is also traversed by a cooling fluid or may be in outside contact relation therewith.

An exemplified embodiment which also operates with a cooling liquid as stated, and in which the support of the fluorescent screen is made of glass is illustrated in Fig. 2. Referring to this figure, 10 again denotes the cylindrical glass bulb on the bottom of which is a chamber 17 with an inlet and an outlet opening 18 and 19, respectively. Through this chamber the chilling agent or refrigerant is conducted, and this makes for a higher load-carrying capacity of the fluorescent screen in addition to such purely optical advantages as have hereinbefore been mentioned. Also in this instance, cooling fins of the nature of ribs 13, Fig. 1, may be provided.

In the form of construction of the tube of this invention comprising a metallic screen support member, it has proved to be particularly advantageous to use a ferro-nickel alloy containing preferably 52% Fe and 48% Ni, or else a ferro-nickel alloy in which a small addition of cobalt has been incorporated, and these can be welded together with the tube bulb in a particularly satisfactory manner also without the use of intermediary means (glasses).

Having described my invention, what I claim is:

1. An electronic device comprising a transparent cylindrical envelope closed at one end, an electron gun mounted within the envelope at the closed end and coaxial with the envelope, a metallic finned end wall having a high polished planar surface sealing the envelope at an angle with respect to the axis of the envelope, the fins of said end wall being external to the envelope, and a layer of luminescent material within the envelope supported on the highly polished planar surface of the end wall.

2. An electronic device comprising a transparent cylindrical envelope closed at one end, an electron gun mounted within the envelope at the closed end and coaxial with the envelope, a hollow metallic end wall, having a highly polished planar surface and inlet and outlet ports for circulating cooling fluid within the hollow end wall, sealing the envelope at an angle with respect to the axis of the envelope, said highly polished surface being within the envelope, and a layer of luminescent material within the envelope supported on the highly polished planar surface of the end wall.

3. An electronic device comprising a transparent cylindrical envelope closed at one end, an electron gun mounted within the envelope at the closed end and coaxial with the envelope, a water-cooled metallic end wall having a highly polished planar surface sealing the envelope at an angle with respect to the axis of the envelope, said highly polished surface being internal to the envelope, and a layer of luminescent material within the envelope supported on the highly polished planar surface of the end wall.

MAX KNOLL.